United States Patent
Ekberg

[11] Patent Number: 5,615,494
[45] Date of Patent: Apr. 1, 1997

[54] APPARATUS FOR TREATING A FILTER CAKE

[75] Inventor: Bjarne Ekberg, Turku, Finland

[73] Assignee: Outokumpu Mintec Oy, Espoo, Finland

[21] Appl. No.: 422,455

[22] Filed: Apr. 17, 1995

[30] Foreign Application Priority Data

Apr. 19, 1994 [FI] Finland .................................. 941795

[51] Int. Cl.⁶ .................................................. F26B 17/00
[52] U.S. Cl. ........................... 34/585; 34/593; 34/181; 34/187; 34/195; 210/771
[58] Field of Search ............................ 34/585, 60, 92, 34/181, 187, 195, 218, 242, 593; 210/771

[56] References Cited

U.S. PATENT DOCUMENTS

| | | | |
|---|---|---|---|
| 3,592,341 | 7/1971 | Emmett, Jr. ........................... | 210/771 |
| 4,411,075 | 10/1983 | Blaudzun ............................. | 34/242 X |
| 4,443,551 | 4/1984 | Lionetti et al. ...................... | 34/585 X |
| 4,837,944 | 6/1989 | Bott ...................................... | 210/771 X |
| 5,177,878 | 1/1993 | Visser .................................... | 34/92 |
| 5,199,186 | 4/1993 | Rice et al. ............................. | 34/242 X |
| B1 4,837,944 | 4/1993 | Bott ...................................... | 210/771 X |

Primary Examiner—John M. Sollecito
Assistant Examiner—Steve Gravini
Attorney, Agent, or Firm—Brooks Haidt Haffner & Delahunty

[57] ABSTRACT

An apparatus for detaching a filter cake created by a suction dryer from off the filter surface of a filter medium and for an essentially simultaneous treatment of the cake to a form advantageous for further processing. The apparatus comprises a suction dryer (1, 11, 27), a connected filter surface (4, 14, 28) and a basin (2, 13, 27) for the material to be filtered. According to the invention, in the vicinity of the filter surface (4, 14, 28) of the filter medium, there is installed a blowing member (7, 17, 21) with at least one part, the blowing effect whereof can advantageously be extended over the whole width of the filter surface (4, 14, 28) of the filter medium, on which surface the filter cake can be formed.

9 Claims, 2 Drawing Sheets

APPARATUS FOR TREATING A FILTER CAKE

BACKGROUND OF THE INVENTION

1. Field of the Invention

The present invention relates to an apparatus for treating a filter cake created with a suction dryer so that the filter cake can be detached from the suction dryer in a form advantageous with respect to further treatment.

2. Description of Related Art

From the FI patent 61,739 there is known a drying method where the object to be dried is placed by intermediation of a fine porous liquid-saturated suction surface to hydraulic communication with a liquid that is maintained at an underpressure in relation to the object to be dried. The advantage of this method is that only liquid penetrates the fine porous suction surface.

The FI patent 77,161 describes a suction dryer utilizing the drying method of the FI patent 61,739, which suction dryer is provided with one or several filter elements. The filter elements are arranged in communication with the slurry that contains drying solids. By means of the suction flow passing through the filter elements, on the surface of the filter elements there is formed a filter cake, which is removed therefrom by means of a special mechanical scraper.

When applying a mechanical scraper for detaching the filter cake, part of the filter cake remains in between the scraper and the filter surface. Therefore the FI patent 87,539 introduces a method where prior to starting the removal of the filter cake, a momentous reversed pressure is caused in the suction dryer, so that a thin liquid film is created in between the filter surface and the filter cake. In connection with the creation of the liquid film, gas blowing is directed to the other edge of the filter cake, so that the filter cake begins to detach from the filter surface. The gas blowing directed to the edge of the filter cake can, when necessary, be boosted by means of another gas blowing arranged at the middle part of the filter surface. However, the use of reversed pressure and two-step gas blowing for instance with thin filter cakes is cumbersome, because in between the blowing steps and at the end of the removal of the filter cake, there always is a big risk that the filter cake is broken into small parts. In that case the effect of the blowing is lost, and the rest of the cake may, owing to the reversed-pressure liquid, be moistened so that the total dampness of the filtering product obtained from the suction dryer surpasses the allowed values. Thus the filtering product must be retreated, which increases the filtering costs considerably.

The object of the present invention is to eliminate some of the drawbacks of the prior art and to achieve an improved apparatus for treating a filter cake essentially simultaneously with its removal from off the filter surface of the filter medium.

SUMMARY OF THE INVENTION

According to the invention, the detaching of the filter cake from off the filter surface of the suction dryer and advantageously the cake treatment carried out for the next process step are performed by means of a blowing member installed in the vicinity of the filter surface of the filter member, the said blowing member having at least one part. The blowing member of the invention can advantageously be arranged for instance in connection with a mechanical scraper or installed movably, so that for example when detaching the filter cake, the blowing member moves essentially near to the edge of the filter cake coming off the filter surface. The invention can also be advantageously applied so that the blowing member is composed of a movably installed blowing element and a stationary blowing element. The blowing member of the present invention and respectively the blowing element of the blowing member are compiled of one or several nozzles, so that the blowing effect of the blowing member or the blowing element is extended essentially over the whole width of that part of the filter medium where the filter cake created in the filtering is formed. The blowing member and respectively the blowing element or elements of the blowing member can advantageously be installed either in an essentially longitudinal or in an essentially transversal position with respect to the filter medium.

In order to detach the filter cake and to process it according to the invention, through the blowing member there is advantageously blown gas or a mixture of gas and liquid, such as vapor. It is also possible to feed solid material through the blowing member, in which case this solid material is used for instance in order to clean the filter surface after the removal of the filter cake. By using the blowing member according to the invention, in connection with detaching the filter cake or prior to the detaching, the filter cake can be adjusted for instance to standard moisture, which is advantageous both in relation to the removal of the filter cake and to the further processing thereof. Moreover, by means of the blowing member, additives can be fed into the filter cake for instance so, that the pH value of the filter cake is adjusted in an advantageous area. In addition to this, the blowing member can be used in order to create a protective atmosphere around the filter cake, for instance in cases where the material to be filtered is easily oxidized.

According to the invention, the nozzle of the blowing member is advantageously designed so that the material to be blown advantageously achieves a high flow velocity even with a low blowing pressure. The employed nozzle can be for example a known Laval nozzle, with which, by applying a nozzle pressure within the range 0.05–0.3 bar, there are achieved flow velocities advantageously within the range 100–300 m/s.

BRIEF DESCRIPTION OF THE DRAWINGS

The invention is explained in more detail with reference to the appended drawings, where.

DETAILED DESCRIPTION OF THE PREFERRED EMBODIMENT

Figure 1:
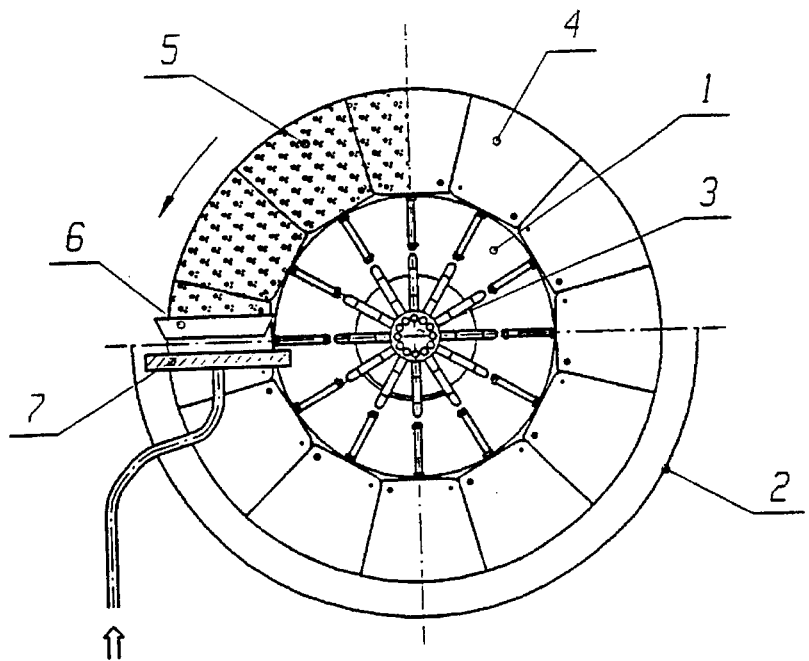
FIG. 1 is a side-view illustration of a preferred embodiment of the invention in partial cross-section.

According to FIG. 1, the suction dryer 1 is arranged on top of the slurry tank 2 so that the suction dryer 1 can be rotated around the axis 3. To the suction dryer 1, there are attached filter elements 4, on the surface whereof the detachable filter cake 5 is formed. For the removal of the filter cake 5, the suction dryer 1 is provided with a mechanical scraper 6, in connection to which the blowing member 7 of the invention is installed so that in the blowing the material to be blown is directed to between the scraper 6 and the filter element 4.

The blowing is carried out in an essentially continuous operation. Depending on the material of the filter cake 5, the blowing is carried out with gas, such as air or inert gas, or for instance a mixture of gas and liquid, in order to adjust an advantageous pH value and/or specific moisture for the filter cake 5.

Figure 2:
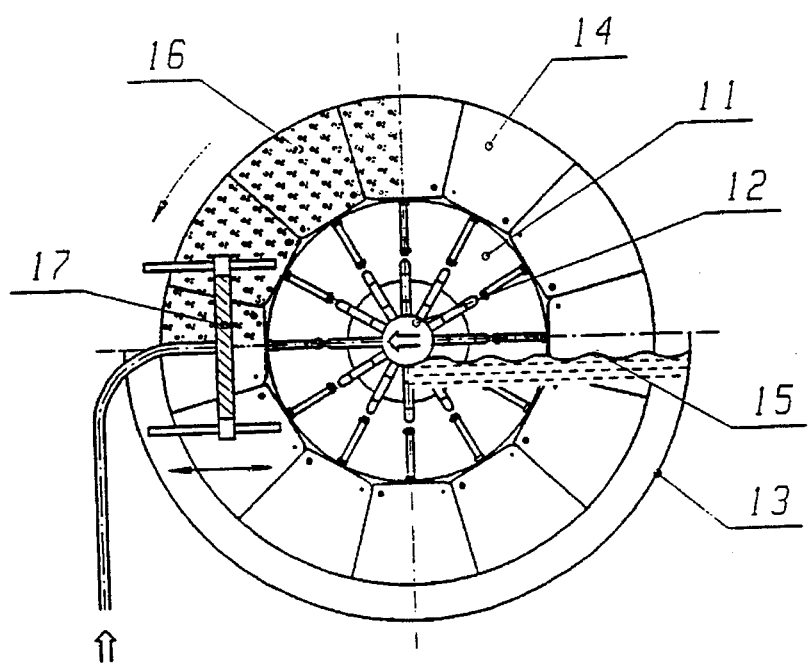
FIG. 2 is a side-view illustration of another preferred embodiment of the invention in partial cross-section.

In FIG. 2, the suction dryer 11 is rotatable around the axis 12 and is installed in connection with the slurry tank 13 so that when rotating around the axis 12, part of the filter elements 14 connected to the suction dryer 11 are driven to below the slurry surface 15 of the slurry tank 13. On the surface of the filter element 14, underneath the slurry surface, there is formed the filter cake 16 of the solids contained in the slurry. In order to remove the filter cake 16 from off the surface of the filter element 14, i.e. from the filter surface, the suction dryer 11 is, according to the invention provided with a blowing member 17. The blowing member 17 is installed in the suction dryer 11, movably with respect to the filter surface of the filter element 14, so that the detaching of the filter cake 16 can be carried out in an essentially rapid fashion. When beginning the removal of the filter cake 16, reversed pressure is switched to the suction dryer 11, and essentially simultaneously gas blowing is directed to the filter cake 16 via the blowing member 17. During the blowing step, the blowing member 17 moves more rapidly with respect to the filter element, so that the removal of the filter cake 16 can advantageously be carried out without the problems caused by the reversed pressure as a possible redampening of the filter cake 16. Thus the filter cake 16 can be detached from off the filter surface of the filter element, advantageously in a desired form and essentially without any cleaning problems of the filter element 14, caused by a possible decomposition of the filter cake.

Figure 3A:
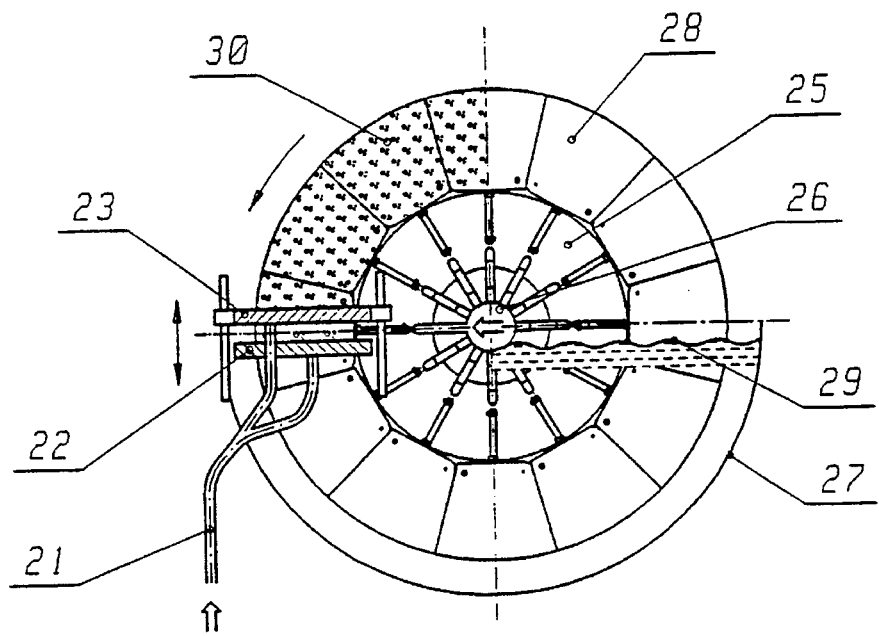
FIGS. 3a and 3b are side-view illustrations of a third preferred embodiment of the invention in partial cross-section.
Figure 3B:
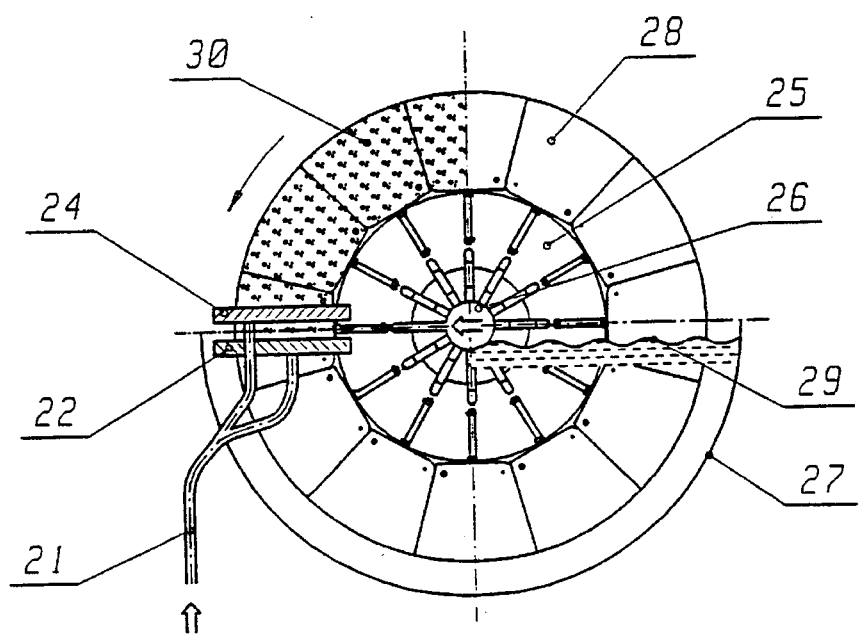

In the embodiment according to FIGS. 3a and 3b, the blowing member of the invention, which in the drawing is denoted with the reference number 21 connected to the blowing material conduit, is composed of two separate blowing elements, the first element 22 of which is installed in a stationary fashion with respect to the suction dryer 25, and the second blowing member being installed either movably 23 (FIG. 3a) or in a stationary fashion 24 (FIG. 3b). The suction dryer 25 is arranged to rotate around the axis 26. The axis 26 is attached to the slurry tank 27, so that when the suction dryer 25 rotates, part of the filter medium 28 connected to the suction dryer 25 is continuously located underneath the slurry surface 29. In the blowing elements 22 and 23 of the blowing member 21, there can advantageously be fed either the same blowing material or different materials. On the basis of this principle, the blowing elements 22 and 23 of the blowing member 21 can be used, depending on the material to be filtered, advantageously for example so that (FIG. 3a) the blowing of the stationary blowing element 22, for instance by using solid material, is directed to the surface of the filter medium 28 in order to clean the filter surface, when the second movably installed blowing element 23 is used for detaching the filter cake 30, for instance in the same fashion as in FIG. 2. On the other hand, when there are used two stationary blowing elements 22 and 24 (FIG. 3b), the blowing of the blowing element 24 is directed to the surface of the filter cake 30 for further processing, for example in order to achieve an advantageous pH value for the filter cake. As for the blowing element 22, it is used for detaching the filter cake 30, for example in the same fashion as in FIG. 1.

I claim:

1. An apparatus comprising a detachment means for detaching a filter cake produced in a suction dryer from off the filter surface of the filter medium and for an essentially simultaneous processing of the cake to a form advantageous for further processing, further comprising a suction dryer, a connected filter surface and a basin for the material to be filtered, wherein in the vicinity of the filter surface of the filter medium, there is installed a blowing member with at least one part, the blowing effect whereof can be extended essentially along the whole width of the filter surface of the filter medium, on which surface the filter cake created in the filtering can be formed.

2. An apparatus according to claim 1, wherein at least part of the blowing member is installed movably with respect to the filter surface.

3. An apparatus according to claim 1, wherein the blowing member comprises one movably installed blowing part.

4. An apparatus according to claim 1 or 2, the blowing member comprises one movably installed blowing part and one blowing part which is installed in a stationary fashion.

5. An apparatus according to claim 1 or 2 wherein by means of the blowing member, the pH value of the filter cake can be adjusted.

6. An apparatus according to claim 1 or 2 wherein by means of the blowing of the blowing member standard moisture of the filter cake can be adjusted.

7. An apparatus according to claim 1 or 2 wherein blowing material of the blowing member is gas.

8. An apparatus according to claim 1 or 2 blowing material of the blowing member is a mixture of gas and liquid.

9. An apparatus according to claim 1 or 2 wherein blowing material of the blowing member is a solid material which is fed.

\* \* \* \* \*